United States Patent [19]

Dooley

[11] 4,125,035
[45] Nov. 14, 1978

[54] CONTROL MECHANISM FOR SPRAY GUNS AND THE LIKE

[76] Inventor: Richard A. Dooley, 400 S. Westwood Ave., Toledo, Ohio 43609

[21] Appl. No.: 766,972

[22] Filed: Feb. 9, 1977

[51] Int. Cl.² .................. G05G 11/00; B05B 3/00; B05B 9/06; B05C 5/00
[52] U.S. Cl. .................. 74/480 R; 118/323; 118/324; 239/227; 239/263; 239/264
[58] Field of Search ............ 198/678; 118/323, 324; 74/479, 480 R; 239/227, 263, 264

[56] References Cited

U.S. PATENT DOCUMENTS

| 2,736,671 | 2/1956 | Ransburg et al. | 239/227 UX |
|---|---|---|---|
| 2,816,741 | 12/1957 | Shuffman | 118/324 X |
| 2,961,990 | 11/1960 | Wruck | 118/324 X |
| 3,027,095 | 3/1962 | Paasche | 239/227 X |
| 3,286,688 | 11/1966 | Blenman | 239/227 X |
| 3,703,880 | 11/1972 | Wampler | 118/324 X |
| 3,884,179 | 5/1975 | Szczepanski | 118/324 X |
| 3,985,161 | 10/1976 | Nelson | 118/323 X |
| 4,010,203 | 3/1977 | Aylon | 118/324 X |
| 4,011,833 | 3/1977 | Hawkins | 118/323 |
| 4,024,836 | 5/1977 | Frank | 118/323 |

Primary Examiner—Samuel Scott
Assistant Examiner—Don E. Ferrell
Attorney, Agent, or Firm—Allen D. Gutchess, Jr.

[57] ABSTRACT

Apparatus is provided for manipulating and controlling the movement of a tool, and specifically a spray gun, through a plurality of predetermined motions. The apparatus includes, in a preferred form, a rectangular frame having crossing supporting rods extending between opposite frame members. A mounting member is slidably mounted on crossing portions of the rods with the spray gun carried thereby. The spray gun is connected to the mounting member in a manner such that it can be moved toward and away from the mounting member in a direction perpendicular to the plane of the frame. The spray gun can also be pivotally moved on a first axis which is parallel to the plane of the frame and pivotally moved on a second axis which can also be parallel to the frame and perpendicular to the first axis. The connecting means also enables at least a spray head of the spray gun, if not the whole spray gun, to be pivotally moved about an axis which is perpendicular to one of the aforesaid two axes. Drive means comprising cables and fluid-operated power means are provided for effecting the aforesaid four movements of the spray gun. A new control system for driving the supporting rods in the frame is also provided, including fluid valves, fluid power means and feedback cables. A unique speed control system is also included.

24 Claims, 17 Drawing Figures

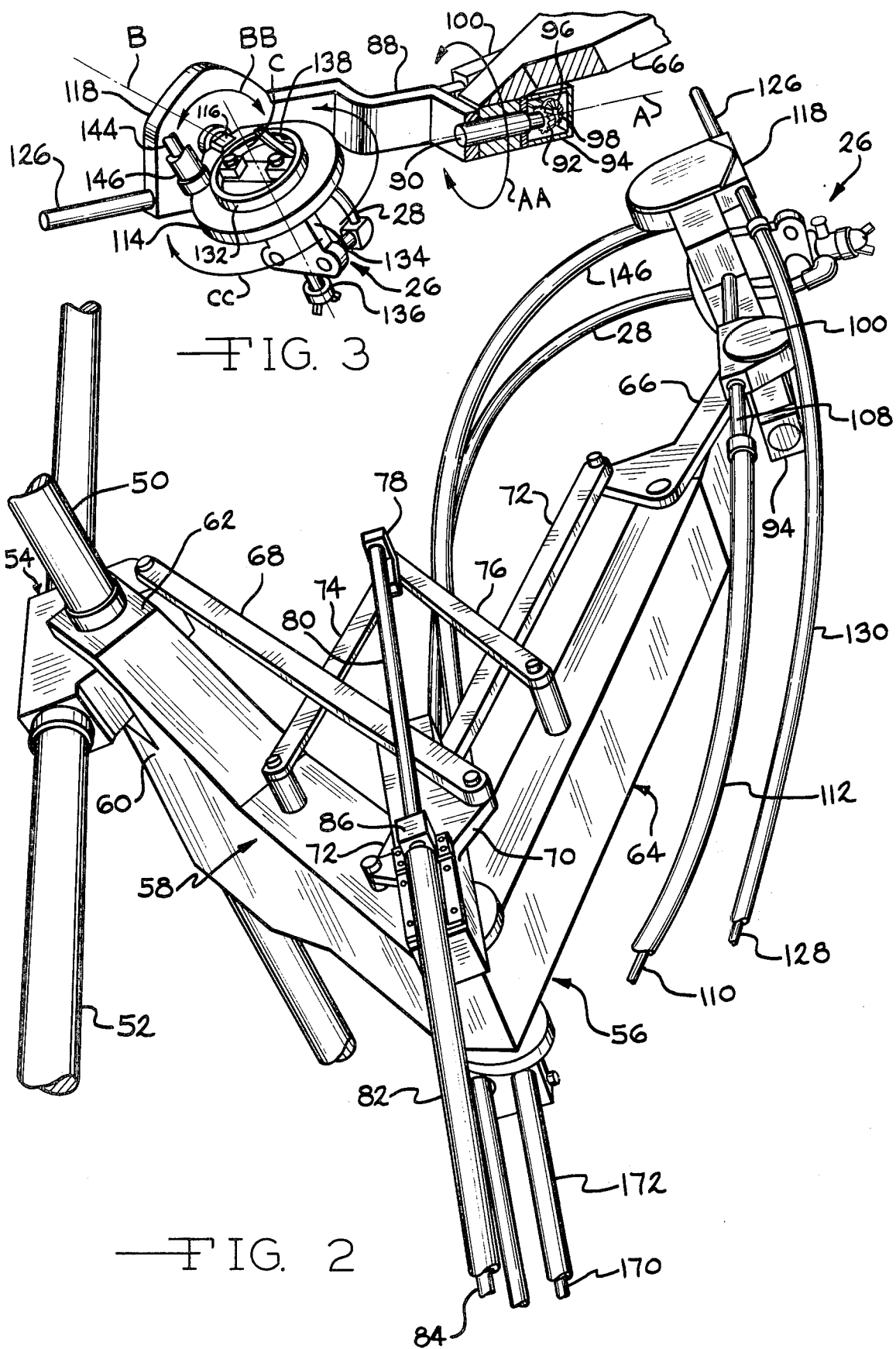

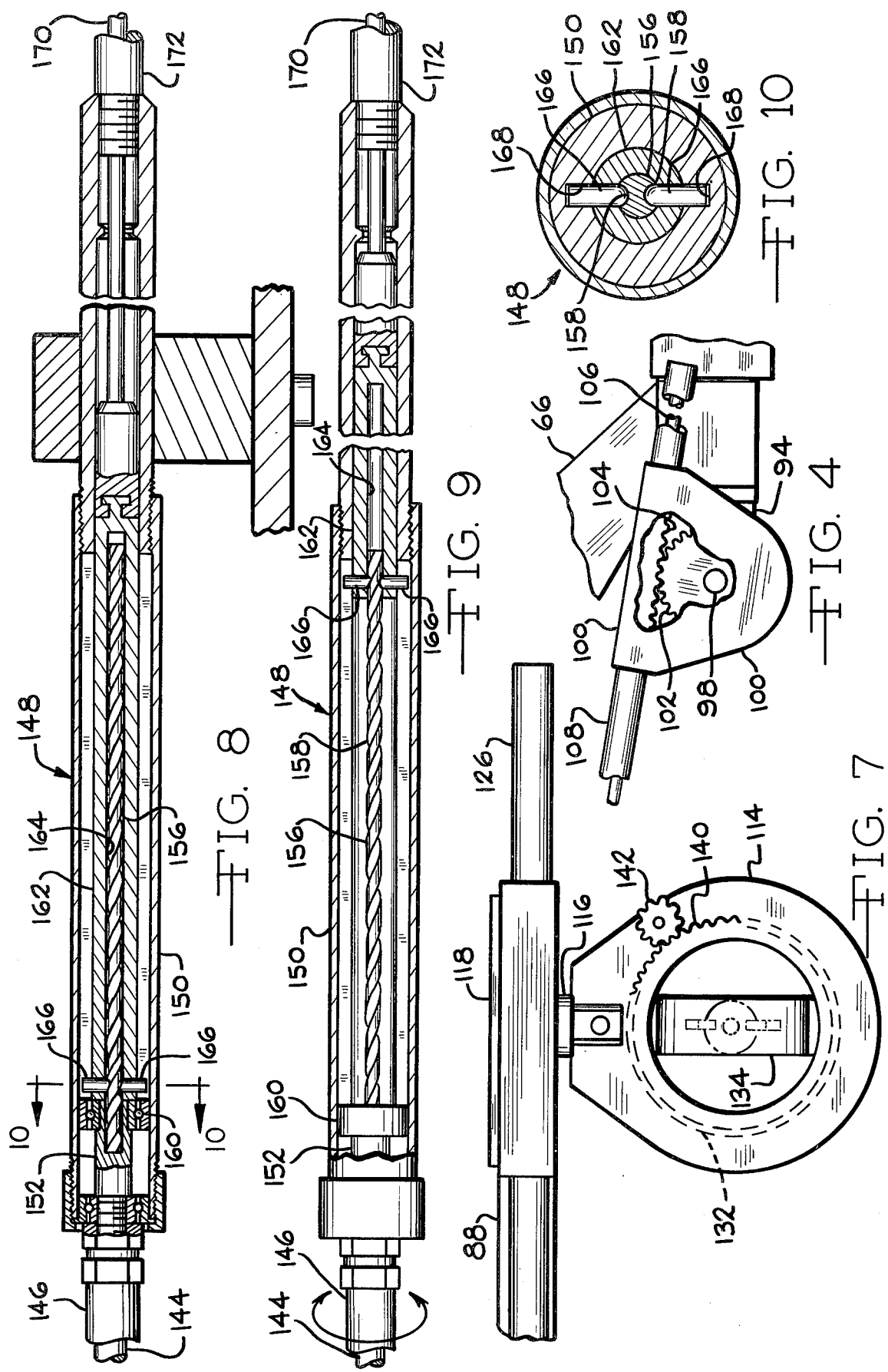

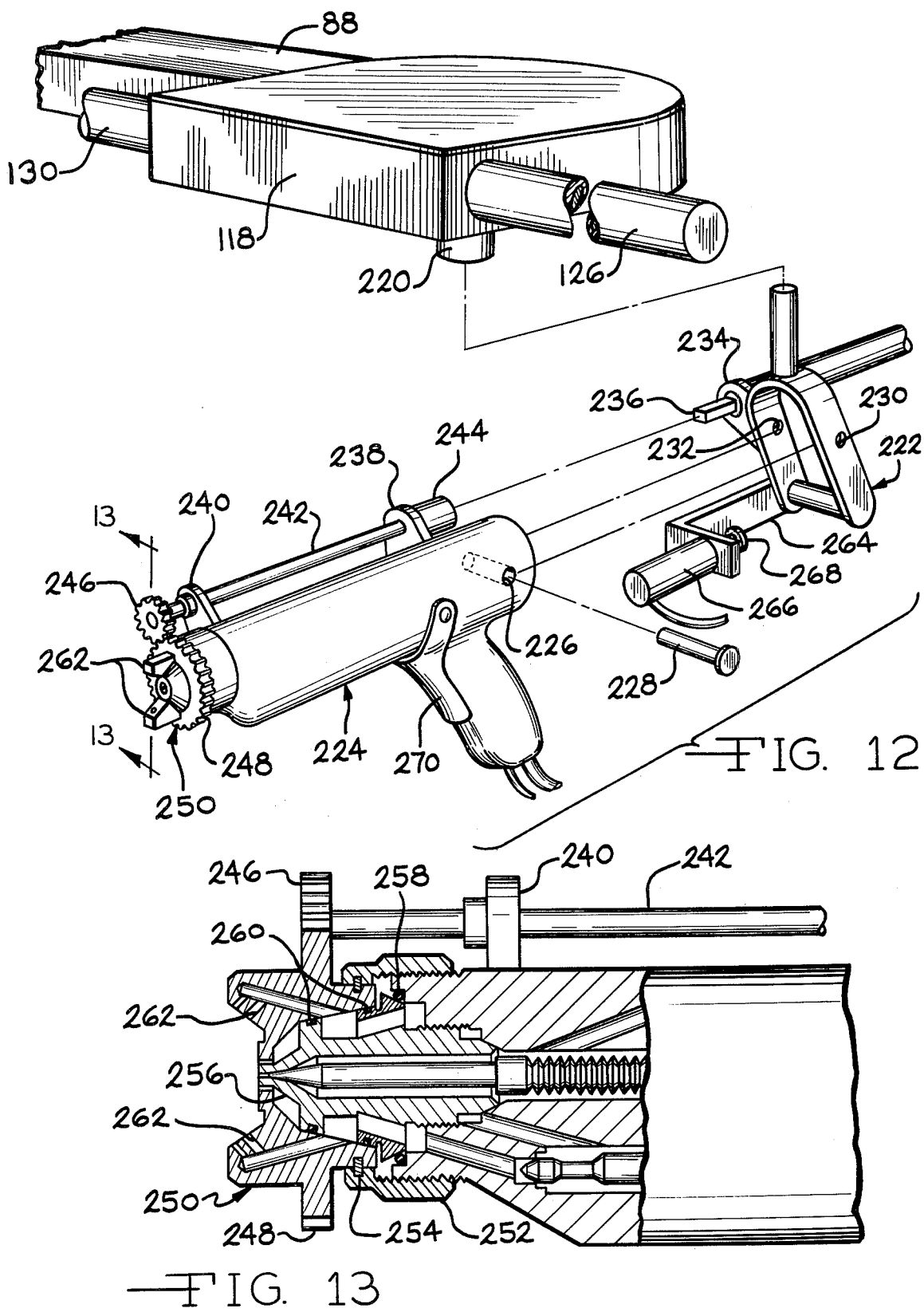

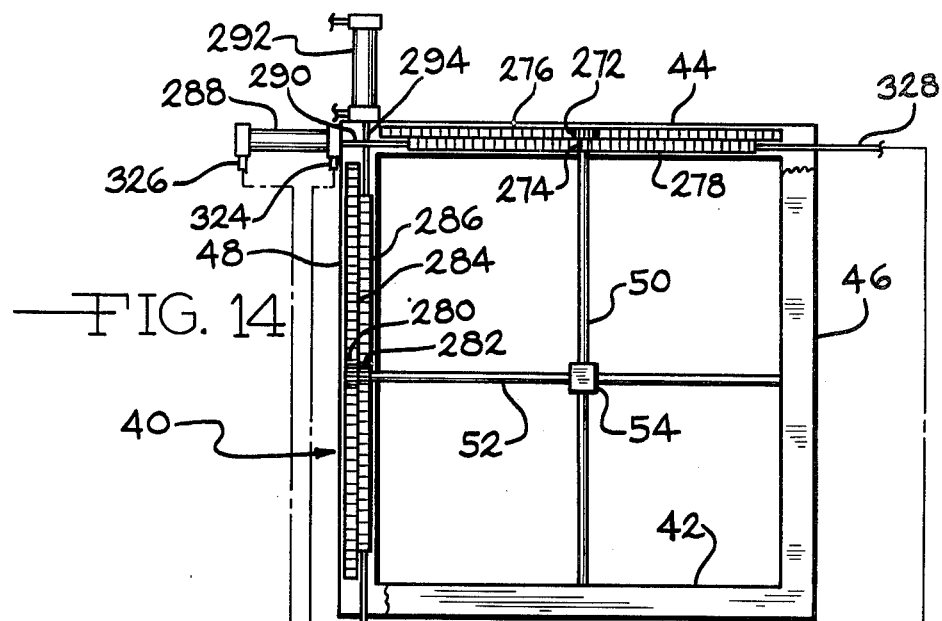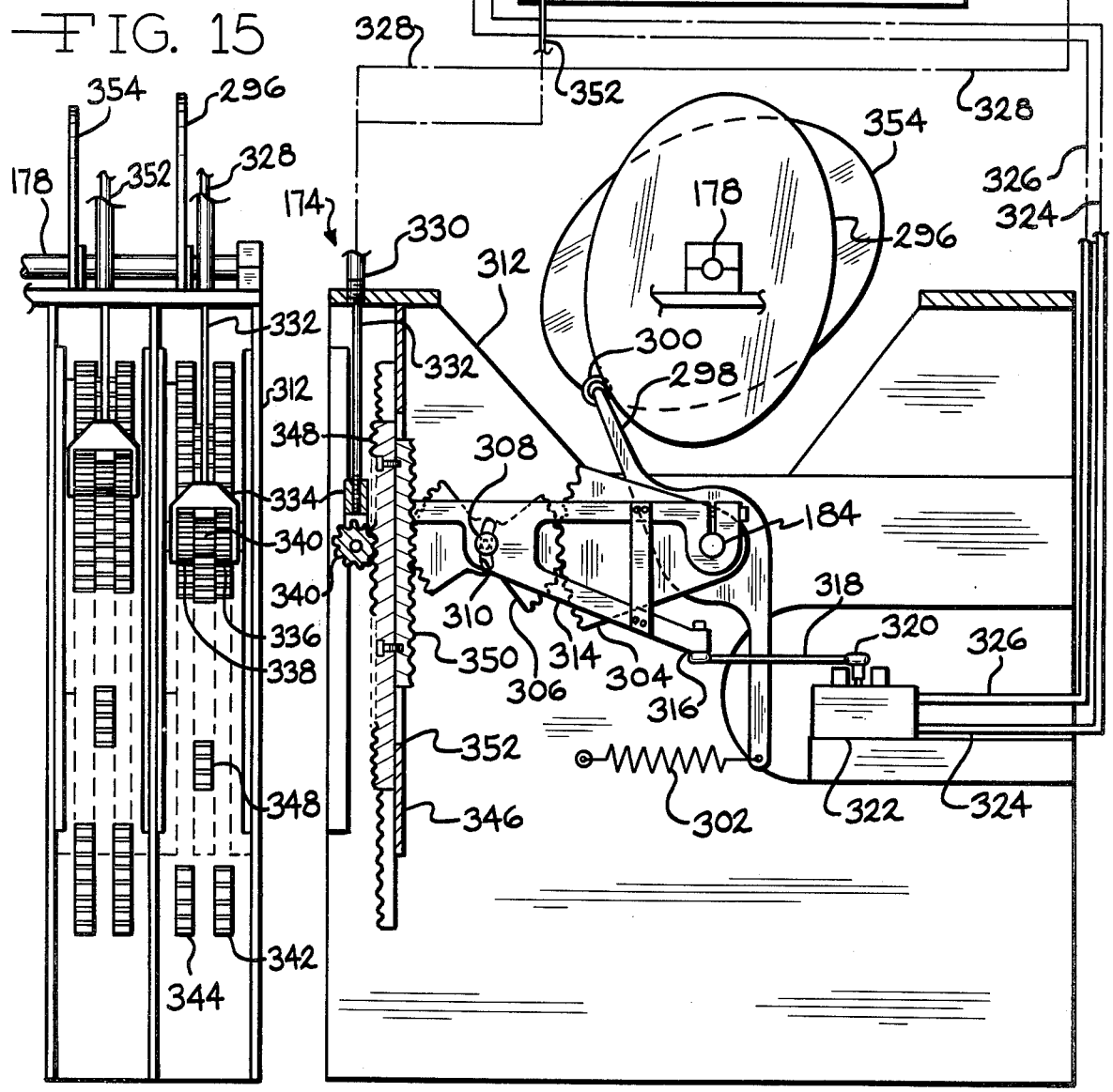

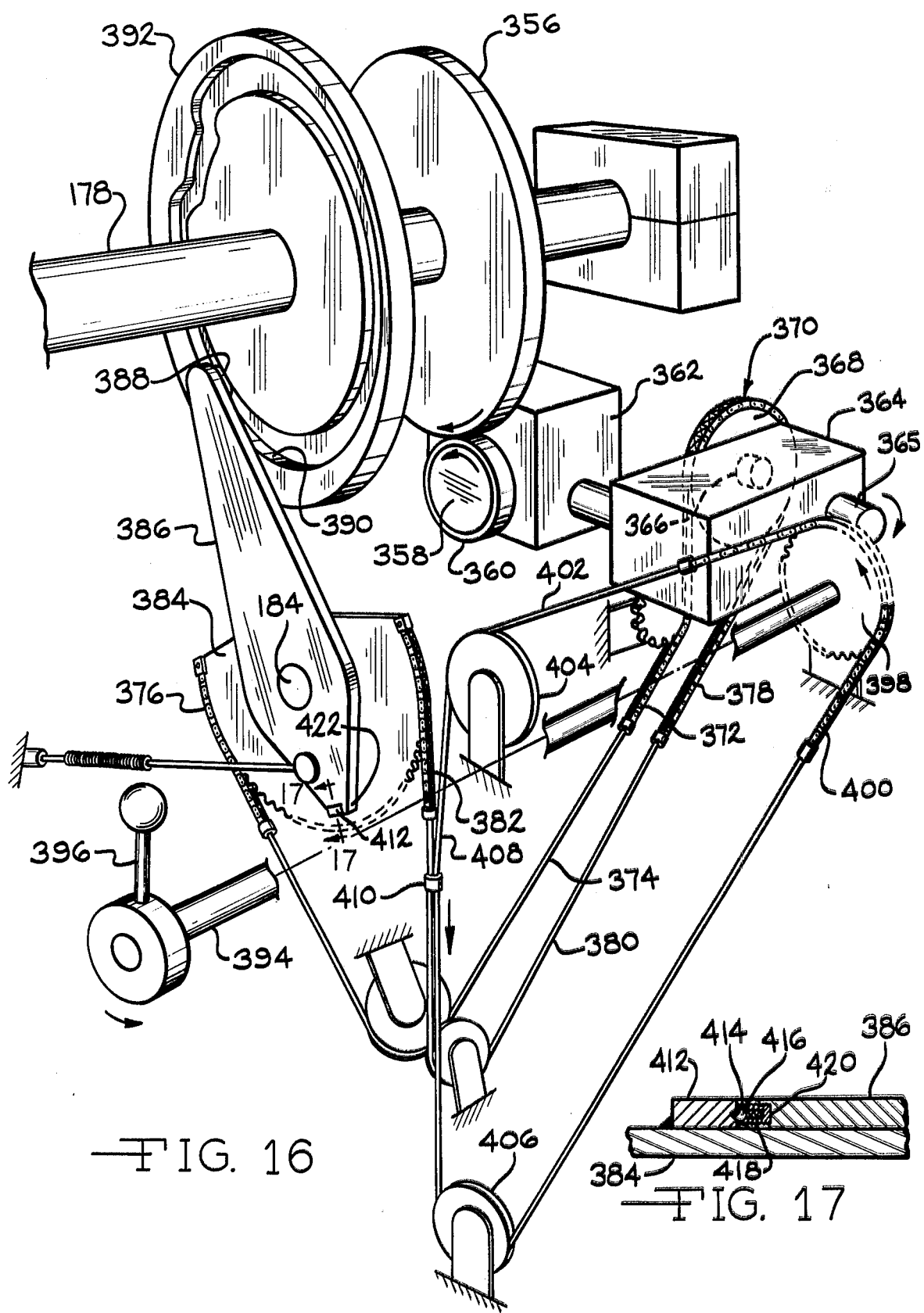

CONTROL MECHANISM FOR SPRAY GUNS AND THE LIKE

This invention relates to apparatus for manipulating a tool, especially a spray gun, through predetermined motions automatically from a remote location.

The apparatus according to the invention is particularly designed to manipulate a tool in predetermined motions in a plane parallel to a conveyor along which workpieces are carried. The tool can be a spray gun located in a spray booth through which the workpieces to be painted are moved along a given path. The spray gun is controlled automatically through motions coordinated with the workpieces to paint or coat them without the use of an operator at all. Further, the spray painting can be accomplished faster and more accurately than when the spray gun is manually controlled.

The basic apparatus with which the present invention is concerned is shown in my U.S. Pat. No. 3,827,309. The apparatus includes a rectangular frame, in a preferred form, which frame has parallel opposite frame members with a mounting member on which the spray gun or tool is mounted being manipulated within the area of the frame and moved in paths parallel to the plane of the frame. Mutually perpendicular, elongate supporting members or rods extend between opposite frame members and cross one another with the mounting member being slidably supported on the crossing portions of both of the elongate members. Each of the elongate supporting members is moved transversely, in directions parallel to the frame members between which it extends. This movement is accomplished by mechanisms located within the frame members, each mechanism including a rack and pinion arrangement which comprises a movable rack, a parallel stationary rack, and two pinions having different numbers of teeth. The pinions engage the two racks and are rotatably carried by the end portions of the elongate supporting members to move with them. This particular mechanism achieves a fast motion for the elongate supporting members across the frame and yet provides excellent accuracy insofar as the ability to accurately position the elongate supporting members and the spray gun is concerned.

The movable racks of the frame members are moved through predetermined motions and sequences by a remote automatic control arrangement. The particular drive arrangement constitutes an improvement on the previous drive arrangement and will be discussed subsequently.

In accordance with the invention, the tool or spray gun is connected to the mounting member in a manner to provide several motions. The connecting arrangement includes means for moving the spray gun in a direction which is perpendicular to the plane of the frame for movement toward and away from a workpiece. The connecting means also enables pivotal movement of the spray gun about a first axis which is parallel to the plane of the frame and also about a second axis which is perpendicular to the first axis. Finally, the connecting means enables at least a spray head of the spray gun to pivotally move or rotate about a third axis which is perpendicular to one of the aforesaid two axes.

More specifically, the connecting arrangement between the spray gun and the mounting member includes a first arm pivotally connected to the mounting member and a second arm pivotally connected to the outer end of the first arm with the spray gun being mounted on brackets which are pivotally connected to the outer end of the second arm. Linkages are provided to maintain the spray gun in a given position relative to the plane of the frame as it is moved perpendicular to the plane. A pushpull cable and associated linkages are connected to the two arms to move them in a scissors-like motion to achieve this first motion for the spray gun. The first bracket which pivots the spray gun to the outer end of the second arm includes a pivotal mount along with a rack and pinion for achieving pivotal movement of the spray gun about the first axis which is parallel to the plane of the frame. This movement also causes pivotal movement of a second bracket which is pivoted to the first and in turn pivotally carries the spray gun and includes a second rack and pinion arrangement to pivotally move the spray gun about the second axis which is perpendicular to the first one. For achieving the pivotal movement of the spray gun about a third axis which is perpendicular to one of the aforesaid two axes, a third bracket can be provided which movably carries the spray gun and has a ring gear and pinion which provide this last, fourth movement.

All four of the above spray gun motions are accomplished through flexible push-pull cables which extend to a remote control cabinet. The cables are controlled by cams which cause lineal movement of the cables to provide the desired four motions of the spray gun. In a preferred form, the cables are moved by hydraulic cylinders, the valves for which are operated through linkages controlled by the cams. With this arrangement, fewer control components need be located near the spray gun and its associated connecting arrangement to correspondingly reduce the weight of the spray gun and its immediate associated components. This also reduces maintenance since the remote controls correspondingly have less tendency to become dirty and require frequent cleaning.

The mounting arrangement for the spray gun can also be designed to carry a conventional hand-held spray gun which can be removed from the mounting brackets so as to be used in a conventional manner by an operator to paint a few pieces or for occasional touch-up work.

The invention further includes an improved drive arrangement for moving the spray gun in the plane of the frame. To accomplish this, the movable racks of the frame are connected directly to hydraulic cylinders which move the racks. The hydraulic cylinders, in turn, are connected through hydraulic lines to remotely located valves located at the control cabinet. The valves are operated through linkages and cams somewhat similar to those employed for the above-discussed four motions of the spray gun. Further, the movable racks of the frames have flexible feedback cables which move longitudinally as the racks move. The cables also connect back to the control cabinet where they operate other gear racks, the positions of which influence the operation of the valves along with the cams. By providing only feedback, the flexible cables in this instance are less subjected to fatigue and wear.

The apparatus according to the invention also includes a speed control arrangement for automatically increasing or decreasing the speed of the motions of the spray gun at desired times. Thus, for example, the spray gun movement can be slowed in areas of the workpiece where a heavier or thicker coating is desired.

It is, therefore, a principal object of the invention to provide improved apparatus for manipulating and controlling the movement of a tool, and especially a spray gun.

Another object of the invention is to provide improved apparatus for manipulating and controlling a tool in predetermined paths relative to a workpiece.

A further object of the invention is to provide apparatus for moving a spray gun through a plurality of predetermined motions by the use of remote controls.

Still another object of the invention is to provide apparatus for moving a spray gun in a lineal path toward and away from a workpiece while pivoting the spray gun on mutually perpendicular axes and for rotating at least the spray head of the spray gun on an axis which is perpendicular to one of the aforesaid two axes.

Still a further object of the invention is to provide improved drives and controls for manipulating a tool or the like relative to the plane of a frame in which the tool is movably carried.

Yet another object of the invention is to provide apparatus for moving a spray gun through a predetermined path and through predetermined motions and for controlling the speed thereof.

Many other objects and advantages of the invention will be apparent from the following detailed description of preferred embodiments thereof, reference being made to the accompanying drawings, in which:

FIG. 2 is a fragmentary view in perspective looking down upon a spray gun and connecting mechanism of FIG. 1;

FIG. 3 is a view in perspective, with parts broken away and in section, of the spray gun and mounting brackets therefor, as shown in FIG. 2;

FIG. 4 is a schematic side view in elevation, with parts broken away, of mechanism for pivoting the spray gun about a first axis which is parallel to the plane of the frame of FIG. 1;

FIG. 7 is a somewhat schematic view in elevation of mechanism for pivoting the spray gun about an axis which is perpendicular to the second axis;

FIG. 8 is a somewhat schematic view in longitudinal cross section of apparatus for translating lineal motion of a cable to rotational motion for rotating a pinion gear of the apparatus of FIG. 7;

FIG. 9 is a view similar to FIG. 8 showing the components in a different position;

FIG. 10 is an enlarged, detailed view in cross section taken along the line 10—10 of FIG. 8;

FIG. 12 is a somewhat schematic, exploded view in perspective of a modified mounting bracket and spray gun by means of which the spray gun can be removed from the bracket and operated separately;

FIG. 13 is a view in cross section taken along the line 13—13 of FIG. 12 of a spray head of the spray gun;

FIG. 14 is a somewhat schematic view in elevation of apparatus for moving the mounting member for the spray gun in paths in the plane of the frame and for remotely controlling the motions through cams;

FIG. 15 is a fragmentary left side view in elevation of the apparatus of FIG. 14;

FIG. 16 is a somewhat schematic view in perspective of speed control apparatus for controlling the speed of the cam set rotation; and FIG. 17 is an enlarged, detailed view in section taken along the line 17—17 of FIG. 16.

Figure 1:
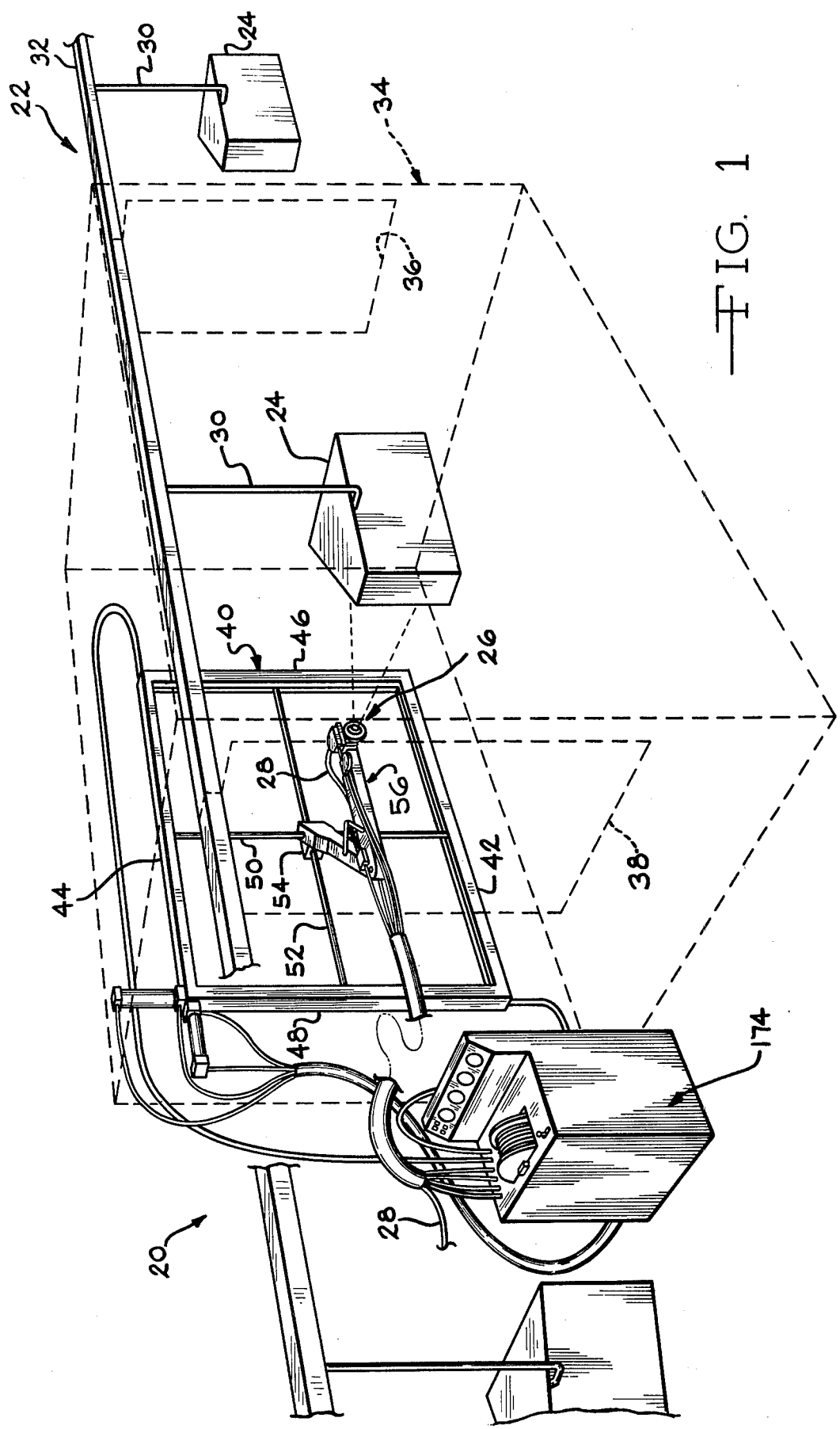
FIG. 1 is a schematic view in perspective, with parts broken away, of overall apparatus embodying the invention.

Referring to the drawings and particularly to FIG. 1, manipulating and control mechanism according to the invention is indicated generally at 20 and is shown along side a conveyor indicated at 22 which carries workpieces 24 to be coated or painted. A tool and specifically a spray gun 26 is used to perform operations on the workpieces 24 moving along the line. Specifically, the spray gun is used to spray a coating material which is supplied to the spray gun through a suitable flexible hose or line 28.

The conveyor 22 includes hangers 30 which support the workpieces 24 and are suspended from chains (not shown) mounted for longitudinal movement within a conveyor rail 32. The conveyor carries the workpieces through a spray booth indicated by dotted lines 34, the spray booth having an entrance opening indicated by dotted lines 36 and an exit opening indicated by dotted lines 38. The spray booth 34 can be of any substantially conventional design having the usual exhaust system and other elements.

The manipulating and control mechanism 20 basically includes a rectangular frame indicated at 40 having a pair of spaced, parallel, horizontal frame members 42 and 44 and a pair of spaced, parallel vertical frame members 46 and 48. A vertically-disposed elongate supporting member or rod 50 extends between the horizontal frame members 42 and 44 and is mounted for transverse movement in horizontal directions parallel to the frame members 42 and 44 to supply a horizontal or "X" motion for the tool 26. A horizontally-disposed elongate supporting member or rod 52 extends between the vertical frame members 46 and 48 and is mounted for transverse movement in directions parallel to the vertical frame members to supply a vertical "Y" motion for the tool 26. Suitable accordion-type bellows can be employed on the elongate supporting members 50 and 52 to keep them clean and prevent paint or other contaminants from being deposited thereon.

The spray gun 26 is actually mounted on a carriage or mounting member 54 which is slidably carried on mutually-perpendicular crossing portions of both of the supporting rods 50 and 52, with the motion of the mounting member being a composite of the straight motions of the supporting rods. By appropriate movement of the rods 50 and 52, the mounting member 54 can be moved through any path within a plane parallel to the frame members and within the area or space defined by the frame 40. The frame 40, of course, should be of a size to enable the spray gun 26 to cover any workpiece within reason which can be carried by the conveyor 22, with the plane of the frame being parallel to the path of movement of the workpieces 24.

A. MOVEMENT OF SPRAY GUN

1. Lineal Movement

The spray gun 26 is connected to the mounting member 54 through connecting mechanism or means 56. This includes a first arm 58 which has one end pivotally connected to the mounting member 54 and specifically by lower and upper legs 60 and 62 which extend on opposite sides of the mounting member 54 and are pivotally received on the vertical rod 50 in this instance. A second arm 64 has an inner end pivotally connected to the outer end of the first arm 58 and has an end mounting bracket 66 pivoted to the outer end thereof. A first link 68 is parallel to the first arm 58 and pivotally connects the mounting member 54 and an intermediate member 70 located at the juncture of the arms 58 and 64. A second link 72 is parallel to the second arm 64 and pivotally connects the intermediate member 70 and the end mounting bracket 66. This linkage arrangement maintains the bracket 66 in a fixed rotational position relative to the plane of the frame 40 as the spray gun 26 moves in and out relative thereto and in a direction perpendicular to the frame. The spray gun 26 will likewise remain in a fixed position relative to the plane unless moved by the other moving means which will be discussed subsequently.

For providing the desired in-out motion of the spray gun, which can be termed a "Z" motion, two converging linkages 74 and 76 have ends pivotally connected at intermediate portions of the first and second arms 58 and 64 with the convergent ends pivotally connected by a bracket 78 to an end of a push-pull rod 80. The rod 80 extends into a sheath 82 in which it is affixed to an end of a push-pull flexible cable 84. The sheath 82, in turn, is affixed by a support 86 to the intermediate member 70. The push-pull cable 84 is moved longitudinally in each direction by means to be discussed subsequently. When the cable 84 is so moved, the rod 80 actuates the links 74 and 76 to move the first and second arms 58 and 64 in a scissors-like motion to move the spray gun 26 through the "Z" motion toward and away from the plane of the frame 40.

2. Pivotal Movement a. About a First Axis

A first supporting bracket 88 is connected for pivotal movement to an end of the mounting bracket 66 by being affixed to a shaft 90. The bracket 88 can thereby pivot about a first axis indicated at A which is parallel to the plane of the frame 40 and specifically is parallel to the "X" axis or the rod 52 carried by the frame. Pivotal movement of the bracket 88 and the spray gun 26 can thus be achieved in the directions of the arcuate arrows designated AA in FIG. 3.

To achieve this pivotal movement of the spray gun about the first axis parallel to the plane of the frame, a bevel gear 92 is affixed to the shaft 90 within a gear box 94. The gear 92 meshes with a bevel gear 96 affixed to a shaft 98 extending at right angles to the shaft 90 and into a second gear housing 100 (see FIG. 4, also). A gear 102 in the housing 100 is affixed to the shaft 98 and, in turn, meshes with a gear rack 104. The gear rack 104 is moved by a push-pull rod 106 located in a rigid tube 108 (FIG. 2) and connects to a flexible push-pull cable 110 which is in a flexible sheath 112 affixed to the tube 108.

When the cable 110 is pushed or pulled, by means to be subsequently discussed, it similarly moves the rod 106 and the gear rack 104. This turns the gear 102 which drives the right angle gears 96 and 92 to rotate the shaft 90 and the first supporting bracket 88. The bracket 88 and the spray gun 26 thereby pivot about the axis A in the directions indicated by the arrows AA.

b. About a Second Axis

Figure 5:
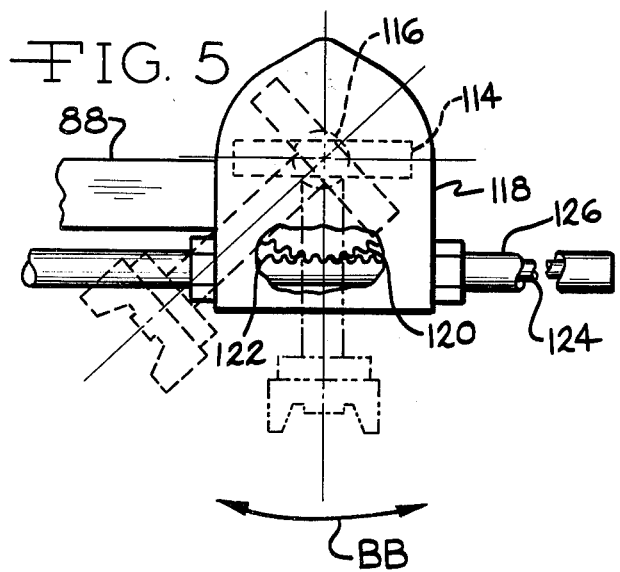
FIG. 5 is a schematic plan view, with parts broken away, of mechanism for pivoting the spray gun about a second axis which is parallel to the plane of the frame and perpendicular to the first axis.

A second supporting bracket 114 is connected for pivotal movement to the first supporting bracket 88 by being affixed to a shaft 116 (FIGS. 3 and 5). The bracket 114 thereby can pivot about a second axis indicated at B which is perpendicular to the first axis A. The axis B also is parallel to the plane of the frame 40 and the "Y" axis or the rod 50 when the bracket 114 is in an upright or vertical position as determined by the position of the bracket 88. Pivotal movement of the bracket 114 is achieved in the directions of arcuate arrows designated BB in FIG. 3.

Figure 6:
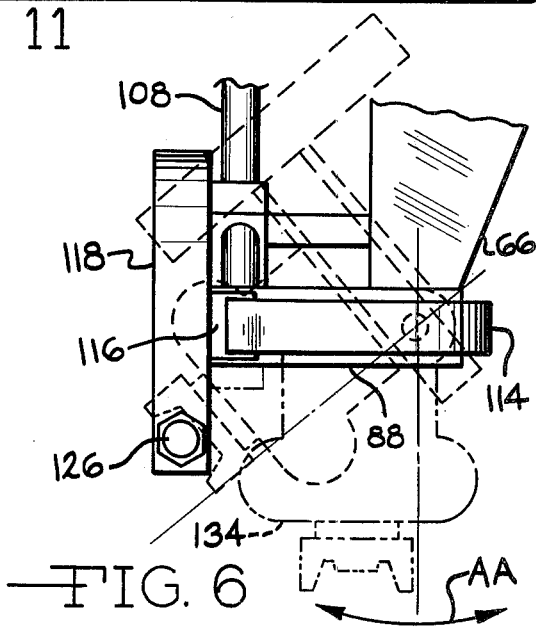
FIG. 6 is a schematic end view of the apparatus of FIG. 5.

To achieve this second pivotal movement of the spray gun about the second axis, the shaft 116 extends into a gear box 118 (also see FIGS. 5 and 6) where it is affixed to a gear 120. The gear 120 meshes with a gear rack 122 which is moved by a push-pull rod 124 located in a rigid tube 126. The rod 124 connects to a flexible push-pull cable 128 (FIG. 2) located in a sheath 130.

When the cable 128 is pushed or pulled, by means to be subsequently discussed, it similarly moves the rod 124 and the gear rack 122. This turns the gear 120 which turns the shaft 116 and the second supporting bracket 114. The bracket 114 and the spray gun 26 thereby pivot about the axis B in the directions indicated by the arrows BB.

c. About a Third Axis

A circular third, supporting bracket 132 (FIG. 3) is rotatably carried by the second bracket 114 for pivotal movement about a third axis indicated at C which is perpendicular to the second axis B. Pivotal movement of the spray gun 26 and the bracket 132 can thus be achieved in the directions of arcuate arrows designated CC. The spray gun 26 is carried by the circular bracket 132 through a mounting plate 134 with an end portion or spray head 136 of the spray gun preferably being aligned with the center of the circular bracket 132 so that the spray head 136 can pivot on the axis C. This enables the transverse cross-sectional shape of the spray emitted from the spray head to be placed in the desired position by the rotation of the spray head. If more than one spray head is used, they are preferably placed symmetrically on each side of the axis C. Coating material for the spray gun 26 is supplied through the flexible line 28 extending through an opening 138 in the bracket 132.

To achieve the third pivotal movement of the spray gun 26 about the axis C, the third bracket 132 is provided with a ring gear 140 (FIG. 7) on the side of the second bracket 114 toward the spray gun 26. This is affixed to and rotates with the third bracket 132. A pinion gear 142 is rotatably held by the bracket 114, meshes with the ring gear 140, and is driven by a flexible shaft 144 (FIG. 3) located in a sheath 146. When the shaft 144 is rotated, the pinion gear 142 is rotated to pivot the ring gear 140, the bracket 132, and the spray head 136.

The flexible shaft 144 is rotated by a translator 148 of FIGS. 8–10 which converts push-pull, lineal motion to rotary motion. The translator 148 includes a housing 150 into which a fitting 152 extends to connect the flexible shaft 144 with an elongate member 156 having two helical grooves 158 therealong. The elongate member 156 specifically can be in the form of a twist drill which is rotatably carried at the shaft end of the housing 150 by suitable bearings 160. When the twist drill 156 is rotated, it causes the flexible shaft 144 to rotate through the fitting 152. A tubular member 162 extends into the housing 150 and has a center passage 164 of a length and size to receive substantially the entire drill 156 when the tubular member 162 extends fully into the housing. At the end, the tubular member 162 carries two projections or pins 166 which are guided in grooves 168 formed in the housing 150 and which also extend through the wall of the tubular member into the helical grooves of the drill 156. When the tubular member 162 moves longitudinally, the pins 166 are prevented from rotating due to their relationship with the grooves 168. Consequently, the longitudinal movement causes the twist drill 156 to rotate and similarly rotate the flexible shaft 144. The shaft, of course, rotates in one direction when the tubular member 162 is moved in one direction through the housing, and rotates in the opposite direction when the tubular member is moved in the opposite direction. Rotary movement of the shaft rotates the pinion gear 142 and pivots the ring gear 140 and the spray gun 26 about the axis C. For providing the lineal motion of the tubular member 162, it is suitably affixed to a push-pull cable 170 which extends through a sheath 172 affixed to one end of the housing.

B. CONTROLS FOR THE FOUR SPRAY GUN MOVEMENTS

Figure 11:
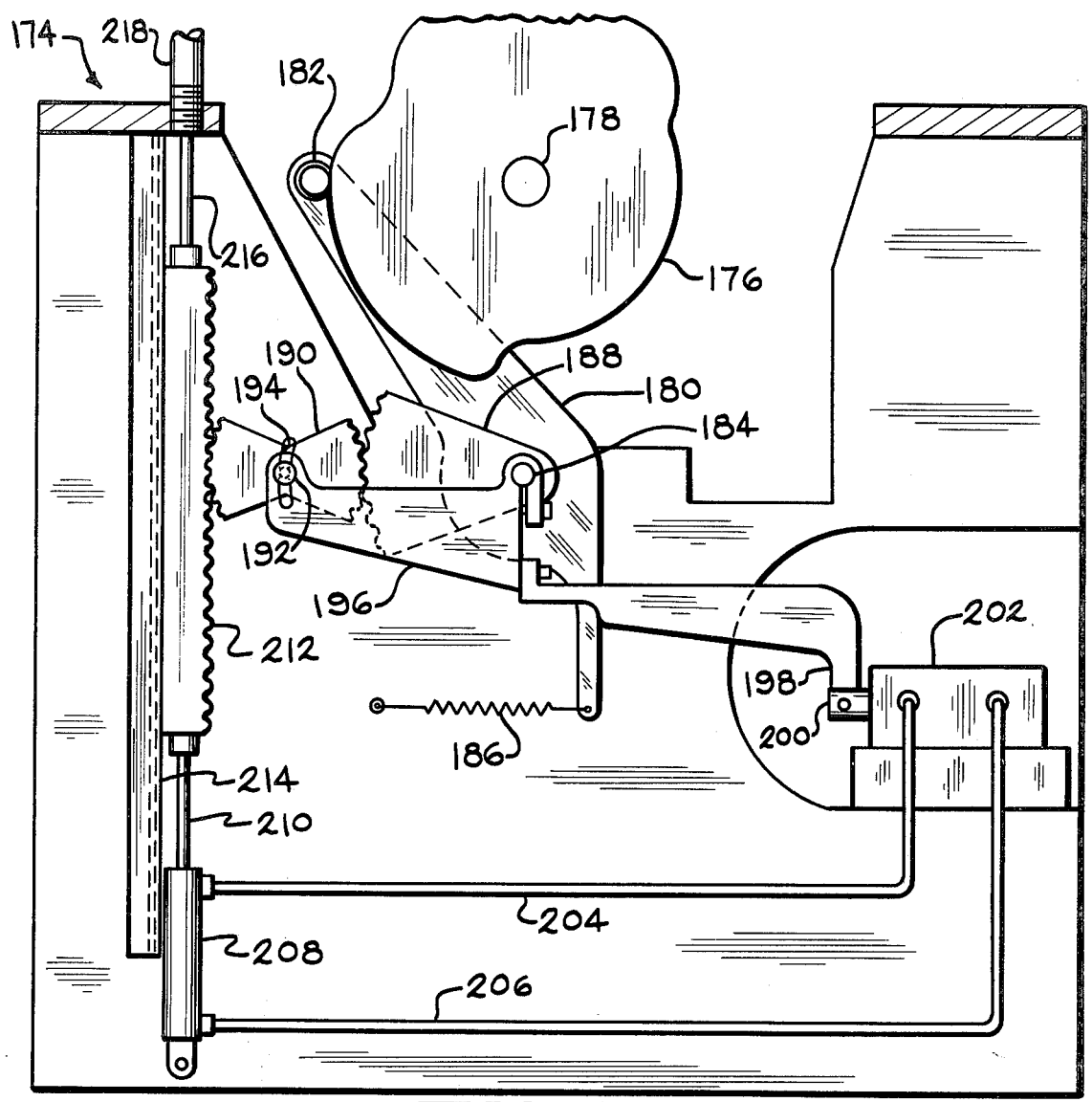
FIG. 11 is a somewhat schematic front view in elevation of driving and controlling mechanism for effecting the four motions of the spray gun.

The drive and control means for the four push-pull cables which provide the four spray gun motions is in a remotely-located control cabinet 174 as shown in FIGS. 1 and 11. The changeable program for each motion of the control system is in a cam 176 mounted on a shaft 178 which is rotatably carried at its ends in back and front wall portions of the cabinet 174. There is a control cam for each of the six spray gun motions which include the "X" and "Y" motions within the frame 40, the "Z" motion perpendicular to the frame 40, and the three pivotal motions of the spray gun 26 about the A, B, and C axes. A cam also controls flow of coating material through the line 28 for the spray gun 26.

A cam follower arm 180 has a suitable roller 182 which contacts the peripheral control edge of the cam 176. In this instance, the follower arm 180 is pivotally mounted on a central axle 184 with a spring 186 at the lower end urging the roller 182 against the cam edge. Rather than employing the spring 186 with the one cam, actually two cams, a left-hand contoured one and a right-hand contoured one, can be employed with two cam followers, one for each cam, being mounted together and pivoted on the axle 184. This provides a positive motion for the follower arm which is not achieved with a spring-loaded arm. However, for simplicity of illustration, the single spring-loaded arm is shown and described.

A gear sector 188 is suitably affixed to the follower arm 180 and pivots back and forth with the arm. The gear sector 188 meshes with a double gear sector 190 which has a central shaft 192 extending through a slot 194 in a wall or a partition of the cabinet 174 to guide the double gear sector for limited vertical movement in the cabinet. The shaft 192 also connects to a lever 196 which is centrally pivoted on the axle 184 with an opposite end 198 pivotally connected to a control rod 200 of a commercially-available, mechanical-hydraulic servovalve 202. The servovalve supplies hydraulic fluid under pressure through lines 204 and 206 to the ends of a hydraulic cylinder 208. A piston rod 210 extending from the upper end of the cylinder 208 is connected to a gear rack 212 which is vertically movable in a suitable guide 214. The gear rack 212 engages the second part of the double gear sector 190 and causes it to move as the gear rack moves up and down. A rod 216 at the upper end of the gear rack 212 extends upwardly through a guide tube 218 and is connected to any one of the push-pull cables 84, 110, 128, and 170 to move them lineally.

In the operation of the control and drive system, as the follower arm 180 moves in a clockwise direction, as viewed in FIG. 11, the gear sector 188 similarly moves and causes the double gear sector 190 to move upwardly when the gear rack 212 is stationary. This causes the lever 196 also to move in a clockwise direction about the axle 184. This motion causes the servovalve 202 to supply hydraulic fluid through the line 204 to the rod end of the cylinder 208, causing the piston rod 210 to retract and the gear rack 212 to move downwardly. The double gear sector 190 moves downwardly to restore the lever 196 to its original position and to actuate the servovalve 202 in a manner to move it back to its neutral position. The control arrangement then remains in this condition until the follower arm 180 is moved once again by the cam 176 during its rotation.

With the gear rack rod 216 moving downwardly with the gear rack 212, if the rod 216 is connected to the push-pull cable 84, the rod 80 also will retract with the cable and cause the spray gun 26 to move in its "Z" motion outwardly away from the plane of the frame 40. If the gear rack rod 216 is connected to the push-pull cable 110 it will cause the spray gun and the first supporting bracket 88 to move in a clockwise direction as viewed in FIG. 3. If the rod 216 is connected to the push-pull cable 128, it will cause the second supporting bracket 114 to move in a counterclockwise direction as viewed in FIG. 3. If the rod 216 is connected to the push-pull cable 170, it will retract the tube 162 and cause the drill 156 to move clockwise as viewed in FIG. 10 which, with the flexible shaft 144, will cause the pinion gear 142 to move counterclockwise as viewed in FIG. 7. The ring gear 140, the third supporting bracket 132, and the spray gun thus pivot in a clockwise direction, as viewed in FIG. 7, or in a counterclockwise direction, as view in FIG. 3.

From the above, it will be appreciated that the drive and control system according to the invention maintains most of the components away from the spray gun 26 and its supporting brackets and arms. This reduces the weight on the brackets and arms as well as keeps components away from the spray gun where they are subjected to contamination from the spray, thus minimizing maintenance problems.

C. MOVEMENT OF HAND HELD SPRAY GUN

While the spray gun 26 is mounted on the plate 134 and the plate, in turn, is connected with the bracket 114 in a permanent manner, it may be desirable at times to have the spray gun designed to be disconnected from the supporting brackets and manipulated by hand. For example, it may be desirable to touch up some workpieces or to coat a small run or number of workpieces by manual manipulation of the spray gun. For this purpose, the supporting system of FIGS. 12 and 13 can be employed. In this instance, the first motion of the spray gun and the first supporting bracket 88 about the axis A is accomplished through the gear box 100 of FIG. 3, as before. Also, the second motion of the spray gun about the axis B is accomplished through the gear box 118, with the rack and pinion of FIG. 5. In this instance, however, a modified drive shaft 220 replaces the drive shaft 116 and is affixed to a modified second supporting bracket 222 which receives the rear end of a hand-held tool or spray gun 224. The spray gun 224 has a transverse bore 226 which receives a removable pin 228 extending through openings 230 and 232 of the supporting bracket 222. The supporting bracket 222 also has a side mounting flange 234 from which a square-ended drive shaft 236 extends, being suitably affixed to the flexible shaft 144 (FIGS. 3, 8, and 9) which now turns the square end of the drive shaft 236 in place of the pinion gear 142.

The spray gun 224 has two bearing ears 238 and 240 extending transversely from the body thereof and carrying a drive shaft 242 having a square-recess socket 244 which receives the shaft 236 when the gun 224 is assembled with the second bracket 222. The forward end of the shaft 242 has a pinion gear 246 which meshes with a ring gear 248 integrally formed directly on a rotatable end portion or spray head 250 at the forward end of the tool or spray gun 224. The ring gear 246 thus pivots the spray head 250 directly whereas the ring gear 140 of FIG. 7 pivots the third supporting bracket 132 which turns the spray gun 26. The spray head 250 is basically of conventional design except that it is rotatably held on the front of the gun by a mounting ring 252 through a snap ring 254 and sealed with respect to a central fluid nozzle 256 by O-rings 258 and 260.

With this arrangement, the spray head 250 is rotated when the drive shaft 242 is turned to provide the third pivotal movement for the spray gun by only turning the spray head instead of the entire spray gun, as is true with the spray gun 26. The spray pattern is thereby changed the same as if the entire gun were pivoted since the spray pattern is determined by air from air horns 262 of the spray head.

The supporting bracket 222 has an L-shaped flange 264 extending forwardly thereof and carrying an electrical solenoid 266 having a reciprocable plunger 268. The L-shaped flange 264 is of a sufficient length to position the plunger 268 in front of a conventional trigger 270 of the spray gun 224 when the spray gun is assembled with the bracket. When the solenoid 266 is energized, the plunger 268 is extended toward the trigger 270 to depress the trigger and to cause the gun to operate. At the same time, however, for touch-up work or for small runs, the spray run 224 can be quickly disassembled from the bracket 222 by removing the pin 228 and disengaging the socket 244 from the square drive shaft 236. The gun can then be operated like any other conventional hand-held spray gun, an electrostatic spray gun being preferred.

D. CONTROL OF "X" AND "Y" MOVEMENTS OF SPRAY GUN ASSEMBLY

The elongate supporting members 50 and 52 are moved in their respective frame members by mechanisms discussed more fully in my U.S. Pat. No. 3,827,309. Referring to FIG. 14, mechanism for moving the elongate member 50 to provide the "X" motion for the mounting member 54 is shown in the upper frame member 44. The mechanism includes a large pinion gear 272 and a small pinion gear 274 which are affixed to one another and are also affixed to the end of the supporting member 50. The large pinion gear 272 meshes with a stationary gear rack 276 while the small pinion gear 274 meshes with a movable gear rack 278.

With this arrangement of the gear racks and pinion gears, a relatively small movement of the movable gear rack 278 will result in a relatively large movement of the pinion gears 272 and 274, along with the supporting member 50. This enables the supporting member to move across the frame at substantial speed and yet the rack and pinion design enables precise movement of the supporting member and, consequently, the spray gun 26.

The elongate supporting member 52 also has a large pinion gear 280 and a small pinion gear 282 affixed thereto, being shown in the frame member 48. These mesh with stationary and movable gear racks 284 and 286, respectively. These gears move the elongate supporting member 52 in the same manner as the supporting member 50.

The movement of the movable gear rack 278 is accomplished by a fluid-operated cylinder 288 having a piston rod 290 connected to one end of the gear rack 278. Similarly, the movement of the movable gear rack 286 is accomplished through a fluid-operated cylinder 292 connected to the movable gear rack 286 through a piston rod 294. Relatively short strokes of the pistons in the cylinders 288 and 292 are sufficient to move the movable gear racks 278 and 286 a sufficient distance to cause the elongate supporting members 50 and 52 to move across the entire frame 40.

In this instance, the supply of fluid under pressure to the cylinders 288 and 292 is controlled by remote controls in the cabinet 174. A cam 296 is mounted on the shaft 178 which also carries the cam 176 (FIG. 11) and the other cams. A follower arm 298 has a suitable roller 300 which contacts the peripheral control edge of the cam 296. The follower arm is pivotally mounted on the central axle 184 and has a spring 302 at the lower end which urges the roller 300 against the cam edge. As discussed in connection with FIG. 11, two cams and two cam followers can be employed for more positive motion of the follower arm.

A gear sector 304 is suitably affixed to the follower arm 298 and pivots back and forth therewith. The gear sector 304 meshes with a double gear sector 306 which has a central shaft 308 extending through a slot 310 in a partition 312 of the cabinet 174 to guide the double gear section 306 for limited vertical movement in the cabinet. The shaft 308 also is connected to a lever 314 which is pivoted on the shaft 184 with an end 316 pivotally connected to a link 318. The link, in turn, is connected to a control rod or arm 320 of a commercially-available, mechanical-hydraulic servovalve 322. The servovalve 322 supplies fluid under pressure through lines 324 and 326 to the ends of the fluid-operated cylinder 288. This causes the lineal movement of the movable gear 278 and results in the "X" motion of the elongate supporting member 60.

A push-pull cable 328 is connected to the opposite end of the movable gear rack 278 and extends back to a guide tube 330 on the control cabinet 174. The push-pull cable 328 is connected to a rod 332 which extends into the cabinet and is affixed to a yoke 334 which rotatably carries two larger pinion gears 336 and 338 and a central, smaller pinion gear 340. The two larger pinion gears 336 and 338 mesh with two stationary gear racks 242 and 244 mounted on a partition 246 in the cabinet while the central, smaller pinion gear 340 meshes with a movable gear rack 348 located between the two stationary racks 342 and 344 and to which an oppositely-facing movable gear rack 350 is affixed. The movable rack 350 extend through an elongate slot 352 in the partition 346 and meshes with the other sector of the double gear sector 306.

When the movable gear rack 278 is moved by the fluid-operated cylinder 288, the push-pull cable 328 is also moved equal amounts and causes movement of the yoke 334 and the three pinion gears 336, 338, and 340. A relatively large amount of movement of these pinion gears moves the central movable gear 348 a smaller distance and causes a like movement of the gear rack 350 and the pivotal movement of the double gear section 306.

In the operation of the control and drive system for the elongate supporting members 50 and 52, as the follower arm 298 moves in a clockwise direction, as viewed in FIG. 14, the gear section 304 similarly moves and causes the double gear sector 306 to move upwardly when the gear rack 350 is stationary. This causes the lever 316 to move in a clockwise direction about an axle 184. The lever then causes the servovalve 322 to supply hydraulic fluid through the line 326 to the blind end of the cylinder 288 and move the movable gear rack 278 toward the right. The push-pull cable 328 then causes the pinion gears 336, 338, and 340 to move downwardly and cause the movable gear racks 348 and 350 to move downwardly. The latter rack, meshing with the double gear sector 306, then moves it downwardly, in a counterclockwise direction, to restore the lever 316 to its original position and to restore the servovalve 222 back to its neutral position. The controls and the supporting member 50 then remain in this condition until the follower arm 300 is moved again by the cam 296 during its rotation.

The movable gear rack 286 for the elongate supporting member 52 similarly has a feedback, cable 352 which operates a similar feedback mechanism located adjacent the first in the cabinet 174, as shown in FIG. 15. A cam 354 adjacent the cam 296 provides the control for the supporting member 52.

With this control system, the push-pull cables 328 and 352, simply act as feedback controls and there is less force and wear thereon than heretofore known.

E. VARIABLE SPEED CONTROL

During the movement of the spray gun with respect to the workpiece, there are times when the motion of the spray gun should be increased or decreased in speed. For example, certain parts of a workpiece might require more paint, as along certain edges or corners thereof. In that instance, the spray gun can be slowed down to apply more paint or coating material in such parts. Also, in larger, flat areas of a workpiece, an increase in the movement of the spray gun might be desirable. To achieve a variation in the speed of the spray gun, the rate of rotation of the cams in the control cabinet 174 can be increased or decreased.

Referring to FIG. 16, to rotate the cams, a circular driven plate 356 is affixed to the cam shaft 178, preferably at a rear portion thereof near the back of the control cabinet 174. This driven plate is in contact with a drive roll 358 having a rubber rim 360 thereon, with the drive roll 358 driven through a gear box 362. The rate of rotation is regulated by a commercially-available variable speed control 364 which is driven through an input shaft 365 connected to a suitable motor (not shown) in the cabinet. The speed of the control 364 is determined by the position of a control shaft 366. A sprocket 368 is affixed to the shaft 366 with the periphery of the sprocket being engaged by a chain 370. An end 372 of the chain is connected through a cable 374 to a chain segment 376 while another end 378 of the chain 370 is connected through a cable 380 to a chain segment 382. The chain segments 376 and 382 are affixed to and engage the periphery of a larger sprocket segment 384. A cam follower arm 386 is releasably affixed to the segment 384, both being mounted on the axle 184, with the follower arm 386 having a roller 388 which is captive in a groove 390 of a speed control cam 392. Pivotal movement of the cam follower arm 386 causes rotation of the control shaft 366 through the sprockets, cables, and chains to accordingly increase or decrease the speed of the drive roll 358 and the cam shaft 178.

The speed control system also is equipped with a manual override to slow down the cam motion and the spray gun motion further or to stop it. Accordingly, a speed control shaft 394 extends out to the front of the control cabinet to a manually-operated handle 396 with the inner end of the shaft 394 having a sprocket 398 thereon which is engaged by a chain 400. The upper end of the chain 400 is connected to a cable 402 which extends around an idler pulley 404 and a lower idler pulley 406 and backup to the lower end of the chain 400. A vertical portion 408 of the cable between the pulleys 404 and 406 is affixed to the vertical portion of the cable 380 near the chain segment 382 by means of a suitable clip 410. The cables thus must move together but the override system has no effect upon the speed control operation as long as the handle 396 is untouched.

When the handle 396 is moved in a counterclockwise direction, it so moves the sprocket 398 with the vertical portion 408 of the cable 402 thus moving downwardly and also correspondingly moving the cable 380. This causes the sprocket segment 384 to tend to move in a clockwise direction with such movement tending to be resisted by the cam follower 386 with the captive roller 388 in the cam groove 390. However, to obtain relative movement between the cam follower arm 386 and the sprocket segment 384, a releasable connection is provided, as better shown in FIG. 17. Here, the sprocket segment 384 has a bar 412 affixed thereto having a central recess 414. A ball 416 extends into the recess, being urged in that direction by a spring 418 located in a holder 420 which is threaded into a bottom end portion of the follower arm 386. The arm 386 has a depending leg 422 located adjacent the bar 412 when the ball 416 is in the recess 414.

When the handle 396 is moved in the counterclockwise direction to move the cable portion 408 downwardly and move the sprocket segment 384 in a clockwise direction, the cam follower arm 386 remains stationary and the bar 412 is moved away from the depending leg 422 in a clockwise direction about the axle 184, also moving the recess 414 out of register with the ball 416. Hence, the cable 380 can move with the cable 402 to move the shaft 366 in a manner to slow down or stop the drive roll 358 through the speed control 364. The handle 396 cannot be moved in the opposite direction to speed up the rotation of the cams since the abuttment of the depending leg 422 of the follower arm 386 with the bar 412 physically prevents such movement.

Various modifications of the above-described embodiments of the invention will be apparent to those skilled in the art, and it is to be understood that such modifications can be made without departing from the scope of the invention, if they are within the spirit and the tenor of the accompanying claims.

I claim:

1. Apparatus for manipulating a tool or the like for performing an operation on a workpiece, said apparatus comprising a frame, first and second elongate supporting members carried by said frame and crossing one another, a mounting member slidably mounted on crossing portions of said elongate members, racks and pinions carried by said frame for moving said supporting members across said frame when said racks are moved, fluid-operated means for moving each of said racks, a control cable connected to each of said racks and movable therewith, remote control means for operating said fluid-operated means, said remote control means comprising a cam for each of said fluid-operated means, a follower arm contacting said cam, a first valve, means connecting said follower arm and said valve for supplying fluid to the corresponding fluid-operated means when said follower arm is moved, and means connecting the corresponding control cable to said connecting means to move said connecting means when the control cable is moved; means movably connecting the tool to said mounting member, said movable connecting means comprising means for moving said tool toward and away from said mounting member in a direction perpendicular to the plane of the frame, means for pivotally supporting said tool on a first axis parallel to the frame, means for pivotally supporting said tool on a second axis perpendicular to the first axis, means for pivotally moving at least an end portion of the tool about an axis perpendicular to one of said first and second axes, a drive cable connected to each of said supporting means for causing said supporting means to move when said drive cables are moved longitudinally; said remote control means further operating each of said drive cables and comprising an additional cam for each of said drive cables, an additional follower arm in contact with said additional cam, an additional valve for said additional cam, additional fluid-operated means for said additional valve and connected to the corresponding drive cable, means connecting said additional follower arm and said additional valve for supplying fluid to said additional fluid-operated means when said additional follower arm is moved by said additional cam, a speed control cam, cam-rotating means for rotating said cams, a speed control follower arm engagable with said speed control cam, a speed control connected with said cam-rotating means for changing the rate of rotation and means connecting said speed control follower arm and said speed control for changing the rate of rotation when said speed control follower arm is moved.

2. Apparatus for manipulating a tool with respect to a workpiece, said apparatus comprising a frame, first and second elongate supporting members carried by said frame and crossing one another, a mounting member slidably mounted on crossing portions of said elongate members, and means movably connecting the tool to said mounting member, said connecting means comprising means for moving said tool toward and away from said mounting member in a direction perpendicular to the plane of the frame, means for pivotably moving said tool on a first axis parallel to the frame, means for pivotably moving said tool on a second axis and perpendicular to the first axis, and means for pivotably moving at least an end portion of said tool about an axis perpendicular to one of said first and second axes.

3. Apparatus according to claim 2 characterized by each of said moving means comprising a push-pull cable, and remote control means for moving said cable, said remote control means comprising a cam, means for rotating said cam, a follower arm in contact with said cam, a valve, fluid-operated means connected to the cable for moving the cable, and means connecting the follower arm and the valve for controlling the supply of fluid to the fluid-operated means.

4. Apparatus according to claim 3 characterized by said connecting means being movable in one direction by the follower arm and being movable in the opposite direction by the fluid-operated means.

5. Apparatus for manipulating a tool with respect to a workpiece, said apparatus comprising a supporting arm, a first supporting bracket pivotally carried by said supporting arm, first drive means for pivotally moving said first supporting bracket about its pivot, a second supporting bracket pivotally carried by said first supporting bracket, second drive means for pivotally moving said second supporting bracket about its pivot, a tool with a tool head carried by said second supporting bracket, and third drive means supported through said second bracket for pivoting at least the tool head of the tool.

6. Apparatus according to claim 5 characterized by said tool being carried by said second bracket through a third supporting bracket pivotally carried by said second supporting bracket, and said third drive means pivots the tool head by pivotally moving said third supporting bracket and said tool.

7. Apparatus according to claim 5 characterized by said first drive means comprising first gear means, and a first push-pull cable for operating said gear means, said second drive means comprising second gear means, and a second push-pull cable for operating said second gear means, said third drive means comprising third gear means, and a third push-pull cable for operating said third gear means.

8. Apparatus according to claim 7 characterized by a flexible shaft connected between said third gear means and said third push-pull cable.

9. Apparatus according to claim 8 characterized by means connected between said third push-pull cable and said flexible shaft for translating longitudinal motion of said third push-pull cable to rotary motion for said shaft.

10. Apparatus according to claim 9 characterized by said translating means comprising an elongate member having helical grooves connected to said flexible cable, and a member having projections extending into said grooves connected to said third push-pull cable.

11. Apparatus according to claim 7 characterized by remote control means including a cam for each of said push-pull cables located remote from the tool for moving each of said push-pull cables longitudinally.

12. Apparatus according to claim 11 characterized by said remote control means comprising a fluid-operated cylinder for each of said push-pull cables having a piston rod connected to said push-pull cable, and valve means for supplying fluid under pressure to said cylinder.

13. Apparatus according to claim 11 characterized by a follower arm for said cam, a gear sector moved by said follower arm, an additional gear sector meshing with said gear sector, a valve for said cam, and lever means connecting said additional gear sector and said valve.

14. Apparatus for manipulating a tool or the like relative to a workpiece, said apparatus comprising means for movably supporting the tool, a cable connected to said supporting means for causing said supporting means to move when said cable is moved longitudinally, remote control means for moving said cable, said remote control means comprising a cam, means for rotating said cam, a follower arm in contact with said cam, a valve, a fluid-operated cylinder having a piston rod, means connecting said piston rod and said cable, and means connecting said follower arm and said valve for supplying fluid to said cylinder when said follower arm is moved by said cam.

15. Apparatus according to claim 14 characterized by said connecting means between said follower arm and said valve comprising a lever.

16. Apparatus according to claim 14 characterized by said connecting means between said follower arm and said valve comprising a lever, a first gear sector movable with said follower arm, and a second gear sector connected to said first gear sector and said lever.

17. Apparatus according to claim 16 characterized by said second gear sector having two oppositely extending gear portions with a first one engaging said first gear sector, said connecting means between said piston rod and said cable comprising a gear rack engaging the second gear portion of said second gear sector and movable in a direction by said fluid-operated cylinder to restore the lever to the position of the lever prior to being moved by said follower arm.

18. Apparatus for manipulating a tool or the like relative to a workpiece, said apparatus comprising means for movably supporting the tool, a gear rack engagable with said movably supporting means, a fluid-operated cylinder having a piston rod connected to said gear rack, a cable connected to said gear rack and movable longitudinally when said gear rack is moved longitudinally, and remote control means for operating said fluid-operated cylinder, said remote control means comprising a cam, means for rotating said cam, a follower arm contacting said cam, a valve, means connecting said follower arm and said valve for supplying fluid to said cylinder when said follower arm is moved, and means connecting said cable to said connecting means to cause said valve to return to the original position when said cable is moved.

19. Apparatus according to claim 18 characterized by said means connecting said follower arm and said valve comprising a gear sector movable with said follower arm, and said means connecting said cable to said connecting means comprising gear means connected between said cable and said gear sector.

20. Apparatus according to claim 19 characterized by said gear means comprising a gear rack movable by said cable.

21. Apparatus according to claim 19 characterized by said gear means further comprising a double gear sector movable by said gear rack and engagable with said first gear sector, and lever means movable by said double gear sector for operating said valve.

22. Apparatus according to claim 19 characterized by said gear means comprising two opposite-facing gear racks connected for simultaneous movement, one of said racks being connected to said gear sector and the other of said racks being connected to said cable.

23. Apparatus for manipulating a tool or the like relative to a workpiece, said apparatus comprising means for movably supporting the tool, remote control means comprising a first cam, means connecting said cam and said supporting means for causing said supporting means to move when said cam is rotated, means for rotating said cam, and means for changing the rate of rotation of the said cam comprising a second cam rotatable with said first cam, a follower arm engagable with said second cam, a speed control connected with said rotating means for changing the rate of rotation, and means connecting said follower arm and said speed control for changing the rate of rotation when said follower arm is moved.

24. Apparatus according to claim 23 characterized by manual override means for disconnecting said follower arm from said last-named connecting means and for manually changing the setting of said speed control.

* * * * *